United States Patent
Neupert

[11] Patent Number: 5,918,618
[45] Date of Patent: Jul. 6, 1999

[54] NATURAL GAS SHUT OFF SYSTEM

[75] Inventor: Mark A. Neupert, Tonawanda, N.Y.

[73] Assignee: National Fuel Gas Distribution Corp., Buffalo, N.Y.

[21] Appl. No.: 08/677,441

[22] Filed: Jul. 2, 1996

[51] Int. Cl.[6] ........................................... F16L 3/22
[52] U.S. Cl. ........................ 137/14; 137/357; 251/57; 73/201; 285/30
[58] Field of Search .................. 137/356, 357, 137/360, 14; 251/57; 73/201; 285/30

[56]  References Cited

U.S. PATENT DOCUMENTS

| | | | |
|---|---|---|---|
| 1,887,999 | 11/1932 | Fow | 73/201 |
| 2,185,068 | 12/1939 | Sholes et al. | 251/57 |
| 2,724,968 | 11/1955 | Greene | 73/201 |
| 2,995,142 | 8/1961 | Nechine | 251/57 |
| 3,746,371 | 7/1973 | Leopld, Jr. et al. | 73/201 |

FOREIGN PATENT DOCUMENTS 2131126  6/1984  United Kingdom ..................... 251/57

Primary Examiner—A. Michael Chambers
Attorney, Agent, or Firm—James J. Ralabate

[57] ABSTRACT

A system for turning off the flow of natural gas into a structure is used where the control is used on the exterior of the structure. The control is operated pneumatically and is connected by an air flow conduit to a valve that is located on a natural gas feed line in the interior of a structure.

18 Claims, 5 Drawing Sheets

FAIL OPEN

FAIL CLOSED

NATURAL GAS SHUT OFF SYSTEM

This invention relates to a gas shut off system and, more specifically, to a process and apparatus for pneumatically stopping the flow of gas into a structure.

BACKGROUND OF THE INVENTION

Generally, gas flow into a residential or commercial natural gas meter can only be terminated by manual means such as a manually-operated shut off valve. The availability or access to such a valve is not always possible because a majority of these meters and valves are internally located in basements or other inaccessible areas. The basic object of the present invention is to provide a system for terminating gas flow through gas meters by external means conveniently located outside a structure be it a residential or commercial building. The access to these external means can be designed so that only authorized personnel can operate them.

There are various known release valves such as those disclosed in U.S. Pat. Nos. 1,146,012; 2,728,547; 2,780,242; 3,536,294 and 4,475,899. In Mason, U.S. Pat. No. 1,146,012, a valve using fluid pressures is disclosed which will activate the opening of a valve upon the use of a push button means. Mason is not concerned with pneumatically controlling the flow of natural gas into a meter. In U.S. Pat. No. 2,728,547 (Crookston et al), a system for utilizing air to open and close mud release valves is disclosed. The Dyson Patent, U.S. Pat. No. 2,780,242, discloses the use of air pressure to control the flow of fluids through the bleeding of a liquid flow. Dyson is primarily concerned with valves that require great volumes of air to operate and may be operated by the expenditure of a very small amunt of energy. In U.S. Pat. No. 3,536,294 (Rodriguez) a foot-operated control valve attachment for water faucets is disclosed. The Muller U.S. Pat. No. 4,475,899 discloses a system of using a balloon connected to a compressible container to control the inflation of the balloon to open and close a valve.

The above patents are illustrative of the prior art of remote operation of a valve. However, none of them remotely suggests the control of flow of natural gas into a meter from a control source outside of a structure.

SUMMARY OF THE INVENTION

It is therefore an object of this invention to provide a pneumatic shut off system devoid of the above-noted disadvantages.

Another object of this invention is to provide a novel apparatus and process for conveniently stopping the flow of gas into a gas meter.

Still a further object of this invention is to provide a novel system including external means for controlling the flow of natural gas into a structure.

Yet another object of this invention is to provide an alternate (to manual means) means of terminating gas flow by means of remote control or operation.

Another yet additional object of this invention is to provide a novel system for terminating gas flow into a meter by the convenient use of conventional or off-the-shelf components.

Still a further object of this invention is to provide a relatively simple, easy to operate yet tamper-proof system of terminating gas flow by means of a remote control device.

These and other objects of this invention are accomplished generally speaking by the insertion of a pneumatic air valve on the gas line before or after the natural gas meter and for providing operation of this valve by an air conduit from a remote location, usually outside the residence or building. Activation would take place by releasing the pneumatic valve air from a desired remote location outside the building. As noted, this valve is inserted into the primary gas or substance flow stream. In an inactive status, it reverts to the closed position. When activated by air pressure, the natural gas then is able to flow. At the remote control means outside the building, means enable access to the air pressure system to allow the release of air pressure resulting in the closing of the gas control valve thus shutting off the flow of natural gas into the building and gas meter. When the terms or phrases "interior" or "exterior" to a structure are used throughout this disclosure, it refers to the inside or outside portions of a house or the like. "Open" position means the valve used in this invention permits natural gas to pass therethrough and "closed" position indicates that the valve has means to prevent the flow of natural gas therethrough.

This system is designed to perform two principal functions in a natural gas application:

(1) The combination of components enables the shut off of the flow of gas at the meter from a remote location. This is customarily necessary in a situation where the gas meter is located inside of the building served and where access to that meter may be restricted. Examples of instances where such capability would be necessary would be the termination of service for nonpayment or the termination of service due to the relocation of the customer being served.

(2) In situations where meters must be removed, this valve enables the service person to stop the flow of gas while removing or changing meters which simplifies and shortens the meter-changing operation.

Also, in case of a fire in a structure, the gas into the burning structure can be turned off from the outside without the need to enter the burning building or structure. Aluminum or metal conduit or tubing should be used since it resists melting during a fire. Also, if desired, a meltable plug can be inserted into the system (at any location) that will melt during a fire and automatically turn off the gas flow by blocking the gas inlet tubing or other conduit.

In a conventional natural gas system located in a house or other building, there is a natural gas inlet line, a gas meter and a gas outlet line extending from the meter to the building distribution system. A conventional pneumatically-operated valve is inserted in the gas line either before or after the meter using any suitable pneumatically-operated valve. A valve that has been used in the present system is a "VA Series Valve & Actuator" with a pneumatically-actuated on/off valve which is available from Buffalo Gauge Inc. of 227 Thorn Ave, Bldg. F, Orchard Park, N.Y. 14127. However, as noted earlier, any suitable pneumatically-operated valve can be used. Other alternatives for this invention are vacuum systems or liquid pressure systems. However, pneumatically-operated valves or systems are definitely preferred for simplicity and ease of operation. This is the valve which controls the operation of the natural gas or substance control valve. It is an entirely self-contained system which is actuated by the introduction of pressurized air. The pressurized air system is separate from the flow of the controlled substance to ensure that there can be no migration of the substance to be controlled into the air pressure system. Air pressure is introduced directly into the actuator valve utilizing a fill pin. An internal check valve prevents the valve from being repressurized from sources other than the fill pin at the fill location. An integral part of the actuator valve is a variable length of small diameter copper tubing extending from the valve to a remote location outside the house which permits air pressure release from a remote location. This component is unique in its design and application.

All aspects of the actuator valve are tamper resistant. Should the copper tubing be cut, the valve fails to a closed position. Should the copper tubing be crimped, a wire inserted into the copper tubing ensures continued air flow allowing the unit to be depressurized from the remote.

Security Systems—Access to the fill location and remote depressurization fitting are secured by locking nuts manufactured by the McGard Corporation of Orchard Park, N.Y. specifically for this application. These nuts can only be removed with a custom wrench of a unique design for this application. Other suitable locking nuts may be used.

Remote Access Valve—This enables access to the air pressure system to allow the release of air pressure resulting in the closing of the substance control valve thus shutting off the flow of the substance to be controlled. This valve is also secured by a McGard locking nut.

A general description of a suitable valve useful in this invention includes:

(a) a normally closed, pneumatic, in line, cessation device that is used to control the flow of a given property by the introduction of air pressure at the device or the release of air pressure from a remote location, or (b) a remotely operated, air pressure actuated, tamper resistant flow control valve for substance control (natural gas) application.

(c) The air pressure actuation system is completely separate from the flow path for the substance to be controlled.

(d) The substance control valve opens (and/or closes depending on application) when air pressure is introduced into the air pressure actuation system of the valve. The flow control valve fails or reverts to the closed position when air pressure is released from the air pressure actuation system.

(e) Air pressure fill valve is sealed with an internal pierce plug to prevent leakage and eliminate the need for an external shut off.

(f) Solder fittings are utilized rather than threaded fittings to minimize potential for leakage in the air pressure actuation system.

(g) Internal check valve prevents air from entering the air pressure actuation system from the relief side of the tee.

(h) In natural gas applications, a hardened steel spin off bar enables the unit to be installed after the meter stop and before or after the meter bar to eliminate the need for swivel locks.

Basically, the valve used blocks off the natural gas opening that supplies the natural gas to the house. Air pressure initially is introduced into the system (by any suitable means) which permits the valve to remain in the open position when the air pressure is permitted to escape the system, the valve closes and blocks off the natural gas conduit leading to the gas network within the house. The term "house" as used throughout this disclosure includes basements, residential buildings, commercial buildings or any other structure having a natural gas line with or without a gas meter.

In summary, this invention is directed to a system wherein a valve, normally in a closed position, is inserted into the natural gas input line and is kept in the open position by the system which connects a column of compressed air to retain the valve open and allow the natural gas to run into the home. When it is desired to stop the flow of gas, the air is released by externally-operated means of an air release device which is located at the end of the column. To prevent the air in the column from being prematurely stopped by a kink or an outside squeezing force, a thin member is inserted into the column's length. To open the valve a safety cap is removed from the system's fill block to display a reusable elastic stopper that is punctured by a special instrument that allows compressed air back into the system.

When the valve reopens the instrument is removed and the elastic stopper contracts and retains the air pressure. The safety cap is then reinstalled in the fill block. To prevent air pressure from being entered into the system at the column, an internal check device is located in the system's fill block.

DETAILED DESCRIPTION OF THE DRAWING AND PREFERRED EMBODIMENTS

Figure 1:
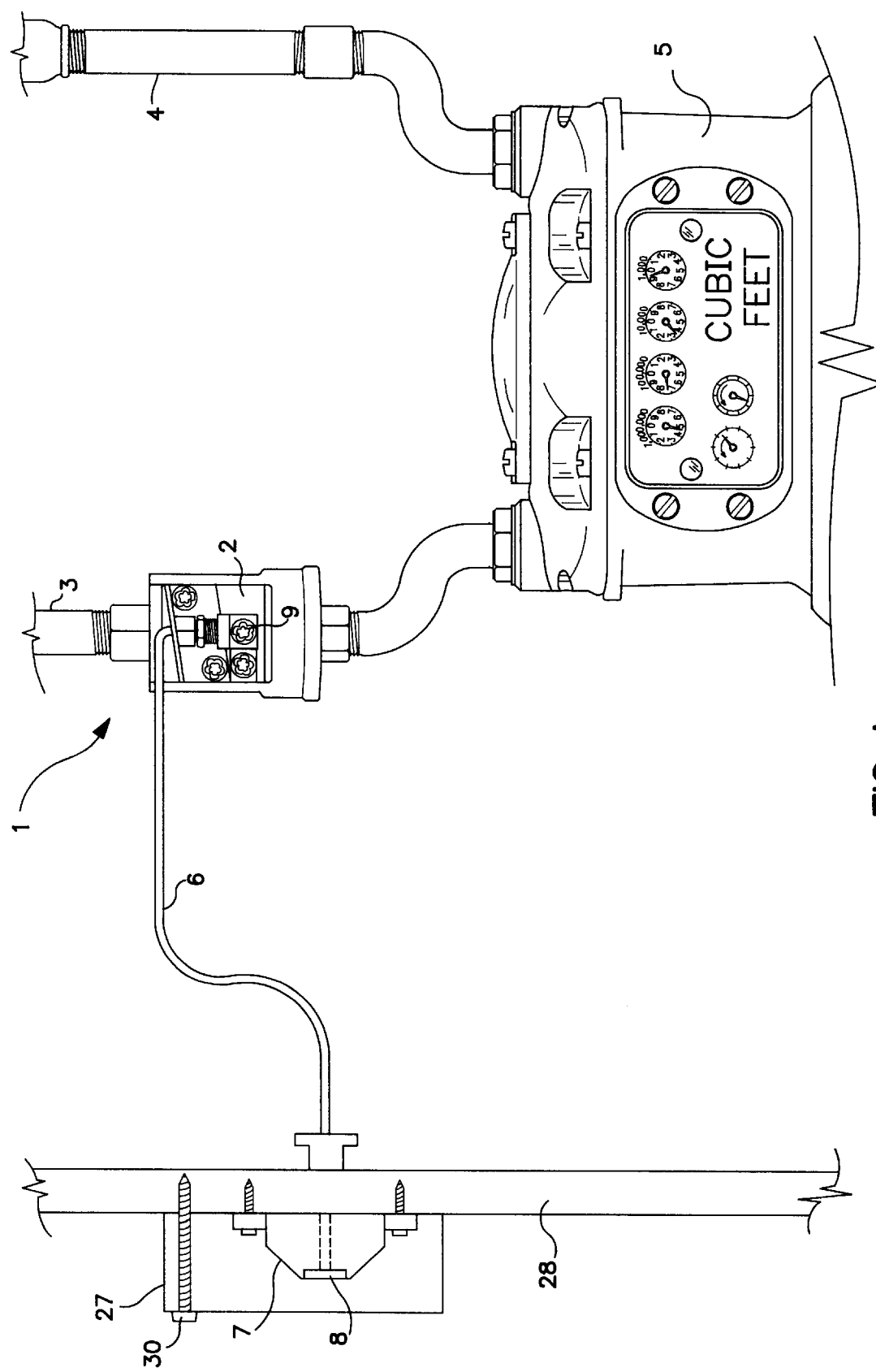
FIG. 1 is a schematic view showing the general system of this invention.

In the system 1 of the invention a pneumatically-operated shut off valve 2 is positioned on a natural gas inlet line 3 or optionally can be located on gas outlet line 4. The gas inlet line 3 is in gas flow connection to a meter 5 which measures the amount of natural gas being consumed or used by the customer. An air supply conduit 6 connects valve 2 to an air or air pressure release means 7 located on the outside wall 28 of the house. The air pressure release means 7 used is similar to the valve used on a tire to release or add air to a tire. The air release means 7 can be located on any convenient location outside a house or garage that is easily accessible to the gas company employee. To turn the natural gas flow off from the outside, a tamper-proof (in an embodiment, a McGard cap is used) cap 8 is removed and an access air release is depressed thereby releasing the air and air pressure in the system 1 and closing valve 2 thereby shutting off the gas flow through gas inlet line 3. Locking cap 8 (tamper-proof) and socket used to remove cap 8 are the type supplied by the McGard Corporation of Orchard Park, N.Y. Once the air is released, natural gas will no longer flow into the system via gas inlet line 3. To reopen valve 2, air is again pumped into the system via pump air inlet means 9 thereby opening valve 2 and allowing gas again to flow through the system 1.

Figure 2:
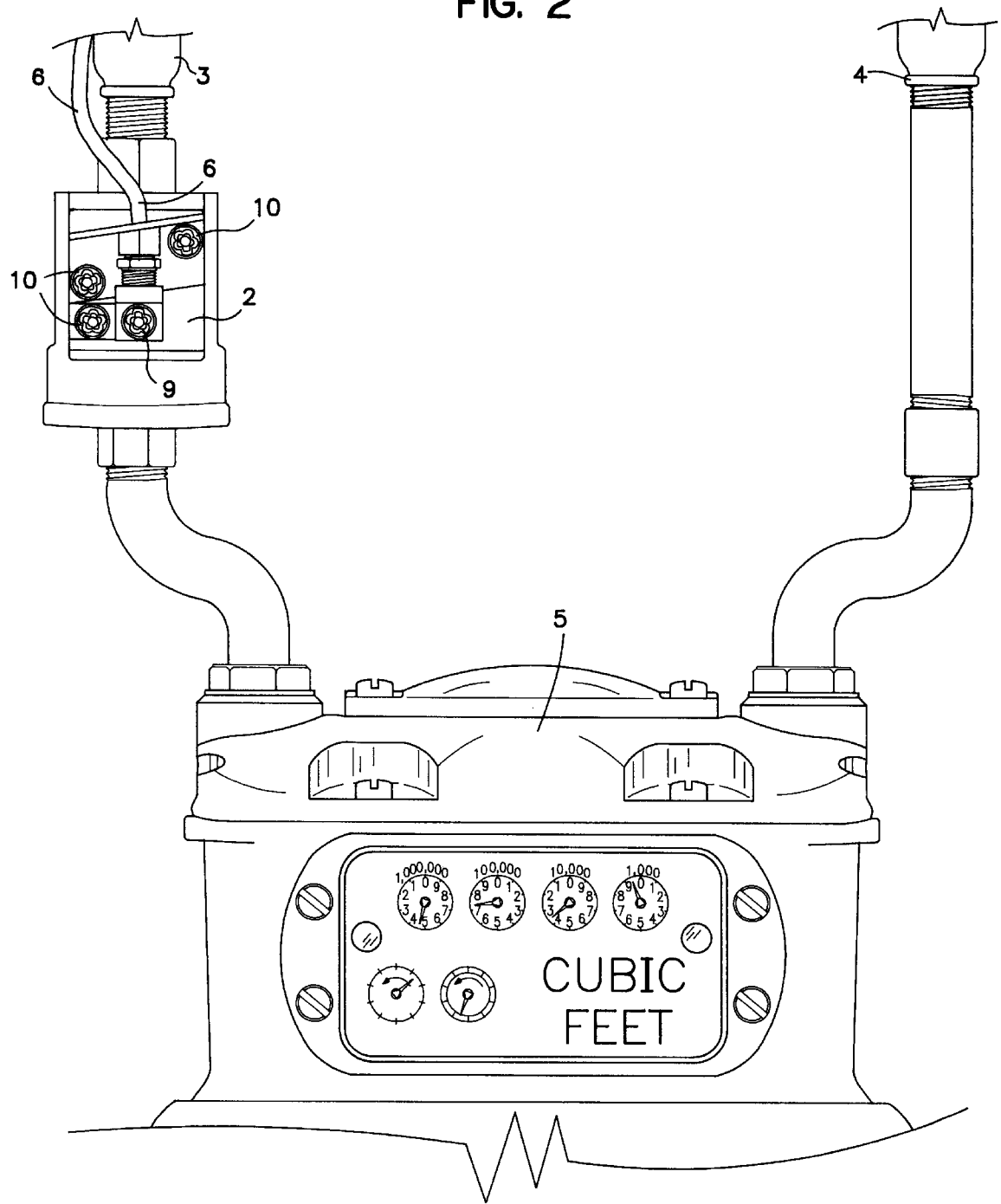
FIG. 2 is a perspective view showing the location of the shut off valve in the system in an embodiment of the present invention.
Figure 3:
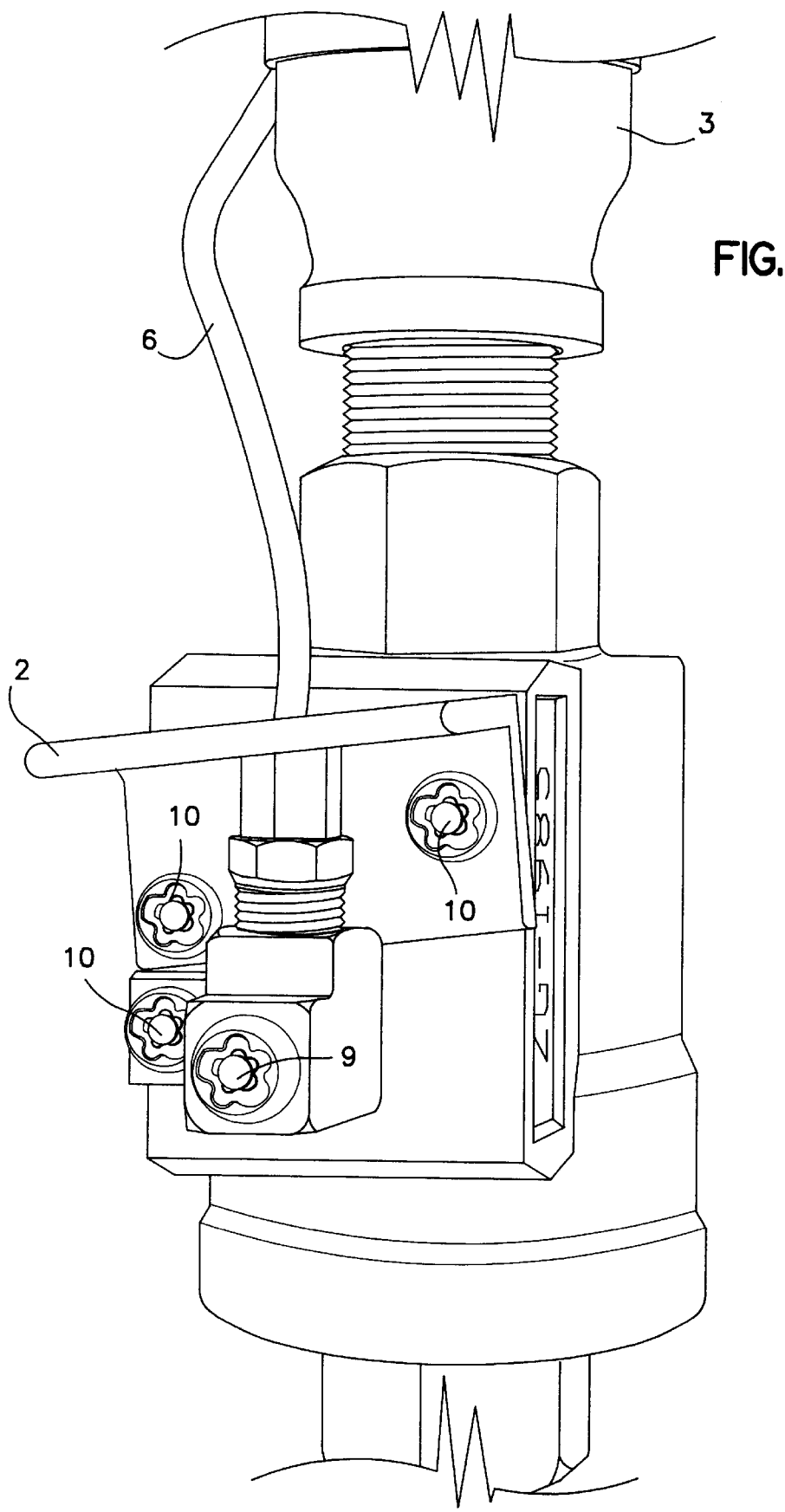
FIG. 3 is an enlarged perspective view of the shut off valve of this invention when connected to the gas inlet pipe and the air conduit.
Figure 6:
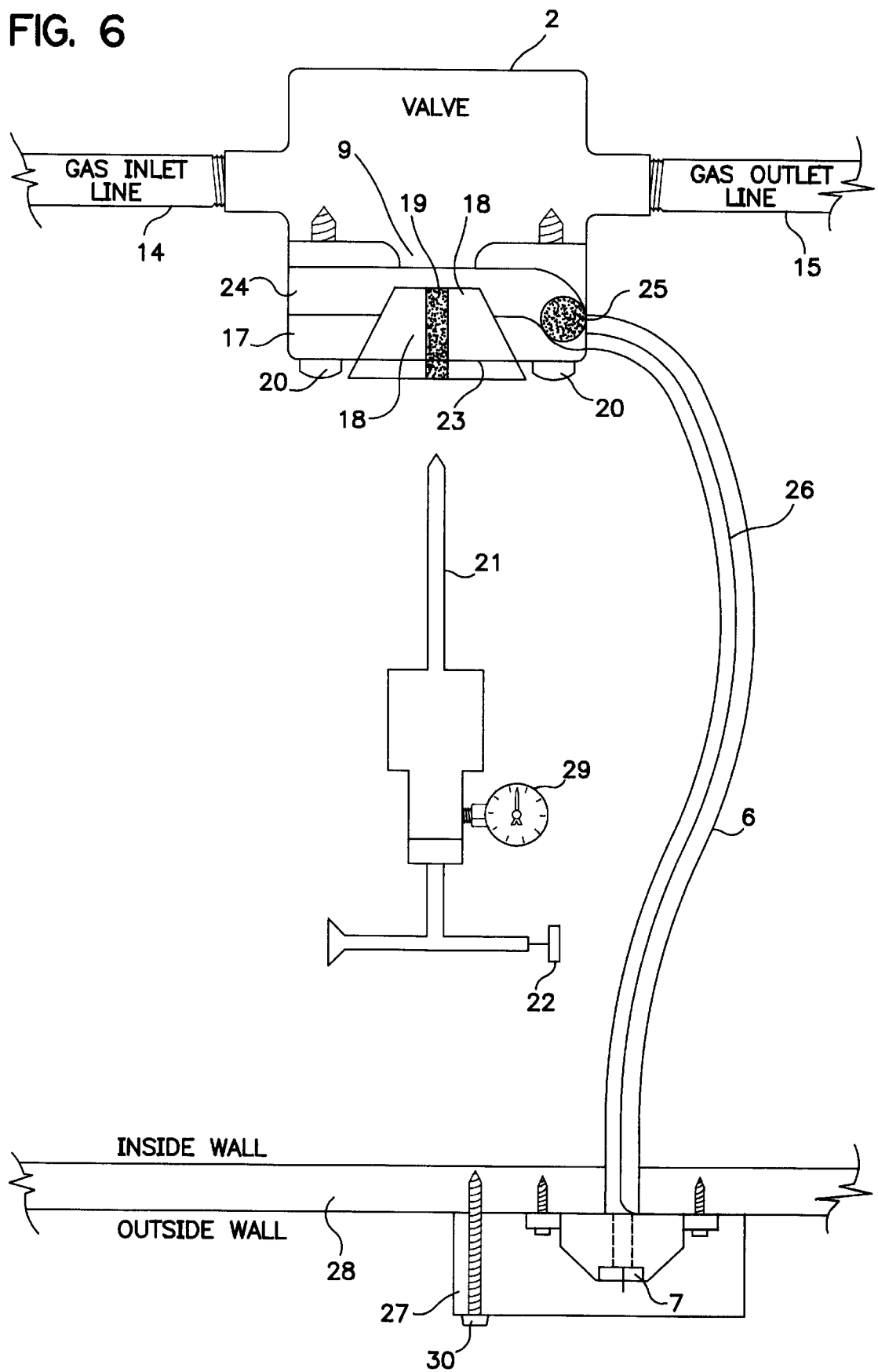
FIG. 6 is a schematic view of the system of this invention illustrating one method of introducing air pressure into the valve and conduit tube of this invention.

In FIGS. 2 and 3, a close-up of valve 2 as installed on gas inlet line 3 is shown. As noted earlier, valve 2 can optionally be installed on gas outlet line 4 if desired. An air introduction or inlet means 9 is shown in valve 2 which is used to introduce air into the system to maintain the valve 2 in an open flow condition thereby permitting natural gas to flow into meter 5 and throughout the house network. FIG. 6 illustrates one simple method of introducing air into the system via air inlet means 9. The gas inlet lines 3 and outlet line 4 are connected to the meter 5 by any conventional means. Tamper-proof screws 10 are used to prevent any unauthorized person from removing the valve 2 or otherwise interfering with its intended operation. Air inlet means 9 also has the same type tamper-proof screw head.

Figure 4:
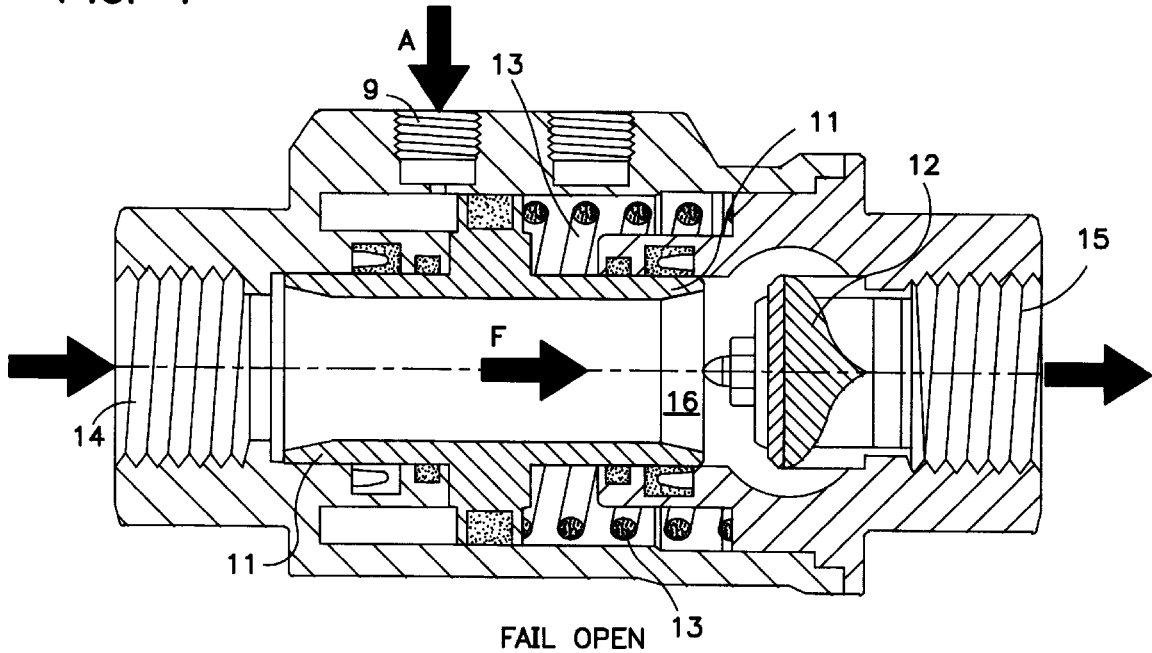
FIG. 4 is a breakaway cross-sectional view of the internal portions of the valve used in the system of this invention when in the open position.

In FIG. 4 an internal view of valve 2 is shown in its open position, for example, when air is in the system and the air pressure causes the movable tubular housing 11 to be separated from tube closure plug 12. Air enters or is pumped into valve 2 via air inlet means 9. The pressure maintained upon spring-loaded housing 11 prevents it from contacting and seating closure plug 12. Springs 13 maintain housing 11 in an open position until the pressure is released and the lack of internal pressure causes housing 11 to move forward and contact closure plug 12 theeby shutting off the flow of natural gas through valve gas inlet 14 and valve gas outlet 15 which is connected to the gas meter 5 as shown in FIG. 5.

Figure 5:
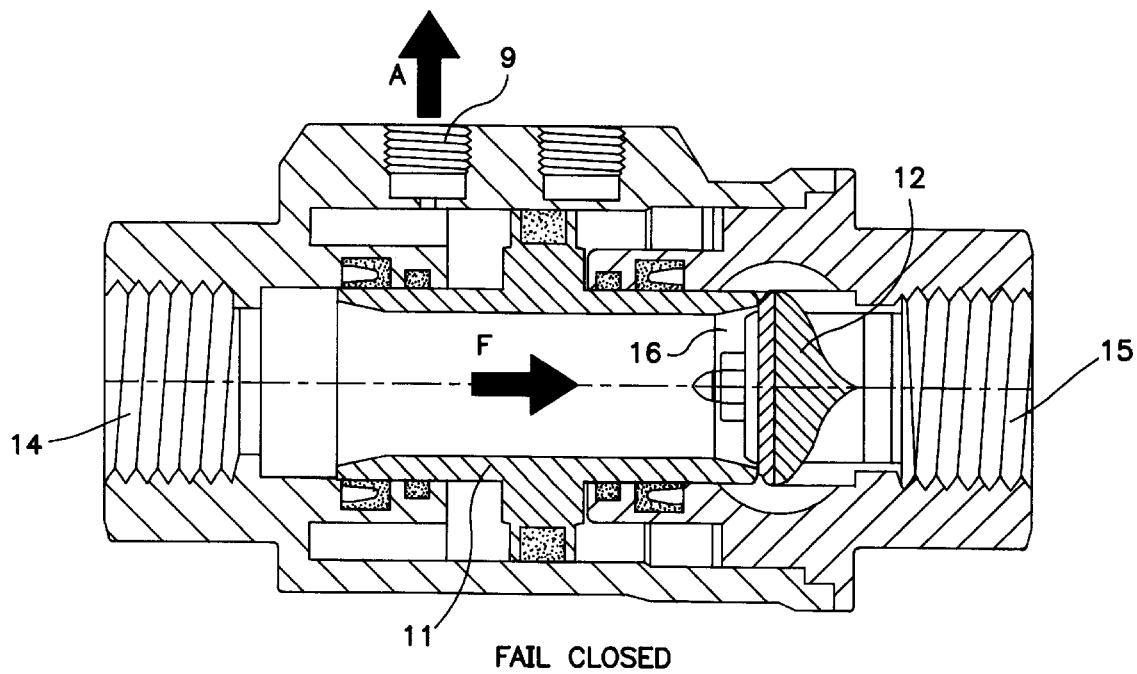
FIG. 5 is a breakaway cross-sectional view of the internal portions of the valve used in the system of this invention when in the closed position.

In FIG. 5 when air is expelled from valve 2 via air conduit 6, the spring 13 is released pushing movable housing 11 forward to meet plug 12 thereby closing off the opening 16 of housing 11 and preventing gas from moving or flowing therethrough. Other pneumatically-operated valves obviously can be used in this invention if suitable. Also, if desired, a valve may be used which utilizes air pressure to close off the flow of gas. Any pneumatic system which operates on air pressure is within the spirit of this invention. The VA Series Valve & Actuator obtained from Buffalo Gauge Inc. is a preferred valve heretofore proven to provide desirable results in the present system. When the present pneumatic system is designed so that the valve 2 is in an open position when air is not in the system, the description of FIG. 4 and FIG. 5 would be modified so that FIG. 5 would show the valve when air is pumpted therein and FIG. 4 would show the valve absent air pressure in the system.

In FIG. 6 a schematic of one embodiment illustrating the system 1 of this invention is shown as it is prepared for activation by the introduction of air therein. Valve 2 is shown having a gas inlet port 14 and a gas outlet port 15. On one side of the valve 2 is an air inlet means 9. Terminating the flow of gas is achieved by installing the pneumatic air valve 2 on the gas inlet line 3. Connected to this pneumatic air valve is a metal block 17. This metal block is secured to the pneumatic air valve 2. The metal block 17 could be secured to the pneumatic valve in different ways. It could be machined with a male thread and screwed into the valve's female air inlet access orifice 9 or the metal block could be machined to accept an "O" ring. The "O" ring could be on the underside of the metal block and sits over the access orifice 9 to the pneumatic air valve 2. The metal block 17 would then be secured to the pneumatic air valve 2 by recessed screws 20. These recessed screws would have irregular head patterns. When these screws are tightened down by a screwdriver with the same irregular pattern, the "O" ring would be compressed and forms a leaktight connection. The metal block 17 is also machined to accept and contain the needed functions to control the pneumatic air valve 2. The metal block 17 contains a recessed rubber stopper or cork 18. This is pressed into the machined metal block 17. The rubber cork 18 has a hole pierced through it at 19. When the metal block 17 is connected to the pneumatic air valve, the rubber cork 18 is in alignment with the pneumatic air valves female access orifice or air inlet means 9. The pneumatic air valve 2 is normally closed. To open the valve a fill pin 21 is pushed into the pierced rubber plugs 18 hole 19. An air pump 22 (with air gauge 29) is connected to the end of the fill pin and air is pumped into the pneumatic air valve and forces the normally closed valve 2 to the open position allowing natural gas to flow into the house houseline. The fill pin 21 is then removed. The pierced hole 19 in the rubber plug or cork 18 contracts and prevents any air pressure from escaping the system. A security cap 23 is then installed over the rubber cork 18 and screwed down to prevent tampering. This cap 23 can only be removed or installed by use of a special socket driver. The head of the screw has an irregular pattern as shown and matches the irregular pattern of the socket. To achieve remote control ability, tubing or air conduit 6 is connected to the metal block 17. The metal block 17 is machined with a tubing orifice that connects with the rubber cork's orifice 19. The tubing 6 is connected to this orifice to achieve an integrated air passage 24 between the rubber cork orifice 19 and the tubing orifice. The metal block 17 is also machined to accept and contain an internal ball and spring check valve 25. This check valve is positioned in the air passage that leads to the tubing orifice. This check valve prevents air pressure from being reintroduced into the valve from other parts of the system. The tubing 6 which can be run to any desired location has a wire 26 placed inside of its total length. This is done to create an irregular surface inside the tubing 6 and prevents the tubing from being squeezed off by outside force which would prevent the release of air pressure which shuts off the pneumatic air valve 2. At the remote end of this tubing 6 (outside) an air release chuck valve or other suitable valve 7 is installed. When this valve 7 is depressed, it allows the air pressure to escape and the pneumatic valve 2 closes and the flow of gas is stopped. The outside air release chuck valve (or other suitable valve) 7 is contained in a protective box 27. This box 27 is mounted on the outside wall and secured closed by use of a security screw 30 with an irregular head pattern similar to 10 shown in FIGS. 2 and 3. A special driver with the same irregular pattern is needed to open or secure the box.

Other ways of filling the system with air obviously can be used; FIG. 6 is merely one method of filling the system pneumatically.

None of the FIGS. 1–6 are drawn to scale. They are all intentionally not proportioned in order that the present invention can be clearly illustrated.

The preferred and optimumly preferred embodiments of this invention have been described herein and shown in the accompanying drawings to illustrate the underlying principles of the invention but it is to be understood that numerous modifications and ramifications may be made without departing from the spirit and scope of this invention. For example, liquid pressure or vacuum could be used as an alternative to pneumatic pressure in the present system. However, pneumatic pressure is highly preferred because of ease of operation and simplicity of installation.

What is claimed is:

1. A process for controlling the flow of natural gas through a structure which comprises providing a pneumatically-operated valve on a natural gas feed line, providing a pneumatic control for said feed line, and providing an gas extending in air flow connection from said pneumatically-operated valve to said pneumatic control, positioning said pneumatic control on an outside portion of said structure and positioning said feed line and said valve in an interior portion of said structure, and using means in said pneumatic control to permit the passage of natural gas through said valve when in an open position and through said feed line.

2. The process of claim 1 wherein said valve is in said open position when gas pressure exists in said system.

3. The process of claim 1 wherein said valve is in said open position when air pressure is absent in said system.

4. The process of claim 1 wherein said pneumatic control has a means for releasing gas from said system.

5. The process of claim 1 wherein said valve has means for permitting the pumping of air into said system.

6. The process of claim 1 wherein said pneumatic control has tamper-proof means to prevent the unauthorized use thereof.

7. The process of claim 1 wherein said valve has tamper-proof means to prevent the unauthorized use thereof.

8. The process of claim 1 wherein said conduit is a tube having a wire extending therethrough for substantially its entire length.

9. The process of claim 1 wherein said valve is positioned in said system at a location adjacent a gas meter.

10. A system for controlling the flow of natural gas through any structure which comprises a natural gas meter, a natural gas feed line with a valve attached thereto, said valve and natural gas meter located in an interior of said structure, a pneumatic control for said natural gas feed line located in a location exterior to said structure, and a gas conduit extending in gas flow connection from said valve to said pneumatic control, said valve when in an open position having means to permit natural gas from said natural gas feed line to pass therethrough, said valve having means to cooperate with said pneumatic control to prevent the flow of natural gas therethrough when said valve is in a closed position and at least one of said valve and said pneumatic control having tamper-proof means integral therewith.

11. The system of claim 10 wherein said valve is in said open position when gas pressure exists in said system.

12. The system of claim 10 wherein said valve is in said open position when gas pressure is present in said system.

13. The system of claim 10 wherein said pneumatic control has a means for releasing gas from said system.

14. The system of claim 10 wherein said valve has means for permitting the pumping of gas into said system.

15. The system of claim 10 wherein said pneumatic control has tamper-proof means to prevent the unauthorized use thereof.

16. The system of claim 10 wherein said valve has tamper-proof means to prevent the unauthorized use thereof.

17. The system of claim 10 wherein said conduit is a tube having a wire extending therethrough for substantially its entire length.

18. The system of claim 10 wherein said valve is positioned in said system at a location adjacent a gas meter.

\* \* \* \* \*